Sept. 29, 1925.
W. C. DIXON
1,555,276
TEMPERATURE CONTROL SYSTEM
Filed Nov. 16, 1921
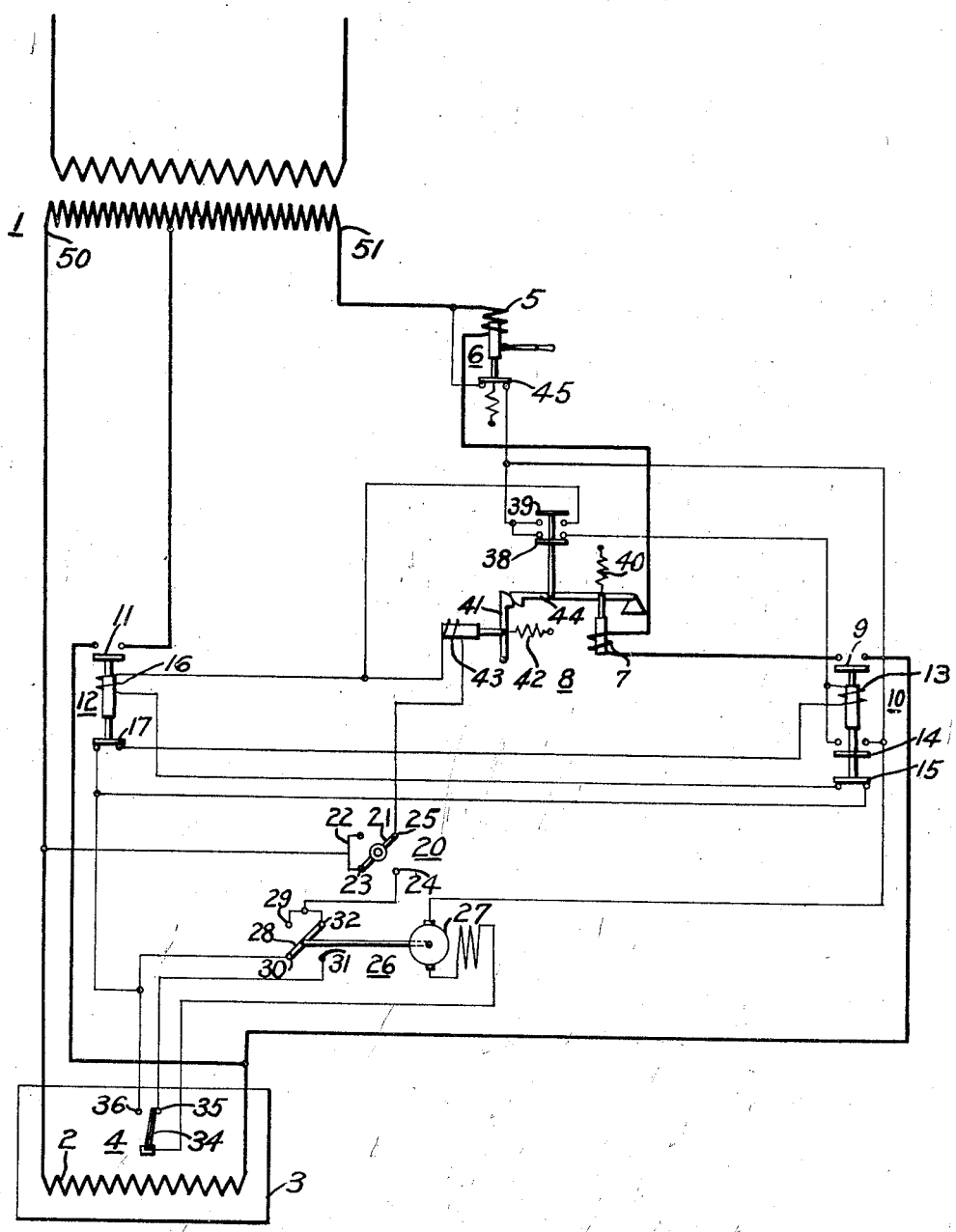
WITNESSES:
Albert G. Schiefelbein
R. J. Fitzgerald
INVENTOR
Walter C. Dixon.
BY
Wesley G. Carr
ATTORNEY Patented Sept. 29, 1925.

1,555,276

UNITED STATES PATENT OFFICE.

WALTER C. DIXON, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-CONTROL SYSTEM.

Application filed November 16, 1921. Serial No. 515,530.

*To all whom it may concern:*

Be it known that I, WALTER C. DIXON, a citizen of the United States, and a resident of Wilkinsburg, in the county of Allegheny and State of Pennsylvania, have invented a new and useful Improvement in Temperature-Control Systems, of which the following is a specification.

My invention relates to control systems and particularly to temperature-control systems for electric furnaces.

One object of my invention is to provide a control system whereby the temperature of an electrically-heated furnace may be maintained within predetermined limits.

Another object of my invention is to provide a control system for an electrically-heated furnace whereby a maximum amount of heat may be developed when the furnace is started from cold condition until the maximum desired temperature is attained and then only sufficient heat developed to maintain the temperature of the furnace between predetermined limits.

Another object of my invention is to provide a control system, of the above-indicated character, that may be controlled by a single manually-operated switch that serves to initiate the apparatus of the control system which is thereafter automatic in its operation.

In practicing my invention, I provide means for so connecting a heating element of a furnace to a source of energy that the heating element may be heated to develop different amounts of energy, depending upon its connection to the source of energy.

If the apparatus is initiated while the furnace is cold and the temperature below a predetermined value, the resistor is connected to develop a maximum amount of heat to heat the furnace quickly.

When the temperature of the furnace attains the maximum desired operating value, the connection of the heating element is so changed that a lesser amount of heat is developed and the temperature of the furnace is then maintained between predetermined limits.

The single figure of the accompanying drawings is a diagrammatic view of a control circuit embodying my invention.

Energy is derived, through a transformer 1, for heating a resistor or heating element 2 of an electric furnace 3. A thermostat 4, that is responsive to the temperature of the furnace 3, co-operates with associated control apparatus to control the heating of the resistor 2 and to maintain the temperature of the furnace 3 within predetermined desired limits.

The apparatus for connecting the resistor 2 to the transformer 1 comprises the operating coil 5 of an overload relay 6, the operating coil 7 of a transfer relay 8, and a main switch 9 that is controlled by an electromagnetic device 10. The switch 9 serves to connect the resistor 2 to the transformer 1 to cause the full voltage of the transformer to be impressed thereon.

A second switch 11, that is controlled by an electromagnetic device 12, serves to connect the resistor 2 between low-voltage terminals of the transformer 1 to permit a smaller amount of heat to be developed by the resistor, or heating element, 2.

The electromagnetic device 10 comprises, in addition to the switch 9, an operating coil 13 and two auxiliary switches 14 and 15, respectively. The switch 14, normally open, closes when the main switch 9 closes, and the switch 15, normally closed, opens when the main switch 9 closes.

The electromagnetic device 12 comprises, in addition to its main switch 11, an operating coil 16 and an auxiliary switch 17 that is normally closed and is opened when the main switch 11 is closed.

The operating coils 13 and 16 are interlocked with the auxiliary switches 17 and 15 to prevent the operation of either electromagnetic device until the other is in a de-energized position.

A manually-operated snap switch 20, comprising a bridging member 21 and four contact members 22, 23, 24 and 25, is employed to initiate the operation of the control apparatus that connects the heating element 2 to the transformer 1. Upon the operation of the snap switch 20 to complete the circuit between the contact members 22 and 24, a circuit is completed through a motor-operated snap switch 26 to energize the operating coil 13 to close the switch 9.

The motor-operated snap switch 26 comprises a motor 27 and a snap switch consisting of a bridging member 28 and four contact members 29, 30, 31 and 32. The motor-operated switch 26 co-operates with the thermostat 4 that is subjected to the temperature of the furnace 3 to control the actuation of the main switches 9 and 11.

The thermostat 4 comprises a thermal-responsive element 34 that engages a stationary contact member 35 when the temperature of the furnace is at, or below, a predetermined value, and engages a second stationary contact member 36 when the temperature of the furnace attains, or exceeds, a predetermined maximum value. The contact members 35 and 36 are connected to the contact members 31 and 30, respectively, of the motor-operated snap switch 26.

After the main switch 9 has been closed to connect the resistor 2 to the transformer 1 to develop a predetermined temperature within the furnace 3, the motor-operated snap switch is controlled by a thermostat 4 to open the switch 9 and to close the switch 11.

A control circuit, whereby the operating coils 13 and 16 are energized, is controlled by the transfer relay 8. The relay 8 comprises a switch 38, that normally is closed, and a switch 39, that normally is open. When the operating coil 7 of the relay 8 is energized, the switch 38 is opened against the tension force of a spring 40 and is then latched in such position by a latching member 41 that is actuated to operative latching position by the tension force of a spring 42. The latching member 41 is provided with a resetting coil 43 which serves, when energized, to actuate the latching member 41 to release the switch-controlling member 44. The spring 40 thereupon recloses the switch 38 and reopens the switch 39.

The circuit of the resetting switch 43 includes the switch 39 so that, when the transfer relay is reset, the circuit of the resetting coil 43 is opened by the switch 39.

When the control equipment of the furnace is to initiated, the switch 20 is moved to complete a circuit between contact members 22 and 24, whereupon a circuit is completed from the terminal 50 of the transformer 1 through the switch contacts and the bridging member of the switch 20, the contact members 30 and 32 and the bridging member 28 of the motor-operated snap switch, the switch 17 of the electromagnetic device 12, the operating coil 13 of the electromagnetic device 10, the switch 38 of the transfer relay 8 and a switch 45 of the overload relay 6 to the terminal 51 of the transformer. The switch 9 is thereupon closed and the resistor 2 is connected to the transformer 1 to be energized by current derived therefrom.

If, at the time the snap switch 20 is closed, the motor-operated snap switch should be in such position that the contact members 29 and 31 would be bridged, the circuit formed thereby would include the thermal element 34 and the contact member 35 of the thermostat and the windings of the motor 27. The motor would thereupon be energized and caused to actuate the switch to the position in which it is illustrated with the bridging member between the contact members 30 and 32. The switch 9 would thereupon be actuated, as previously described.

When the switch 9 is closed to permit current to traverse the heating element 2, the switch 14 is also closed, and the coil 7 of the transfer relay 8 is energized to effect the opening of the switch 38 and the closing of the switch 39. However, since the switch 14 is connected in shunt relation to the switch 38 and is closed before the switch 38 is open, the circuit of the coil 13 is maintained closed.

When the temperature of the furnace 3 attains such value that the thermal-responsive member 34 engages the contact member 36, a circuit is completed that includes the motor 27 and effects the actuation of the snap switch 26 to cause the bridging member 28 thereof to engage the contact members 29 and 31 and to open the circuit between the contact members 30 and 32. When the circuit between the contact members 30 and 32 is open, the coil 13 becomes de-energized and switch 9 is opened.

As the temperature of the furnace tends to decrease by reason of the heat losses, the thermal-responsive element 34 moves to engage the contact member 35, whereupon the motor is energized to actuate the snap switch 26 to such position that the bridging member 28 re-engages the contact members 30 and 32, as shown in the drawing.

The switch 15 having been closed subsequent to the opening of the switch 9, a circuit is now completed from the terminal 50 of the transformer, through the snap switch 20, the snap switch 26, the switch 15, the coil 16, the switch 39 of the transfer relay 8 and the switch 45, to the terminal 51 of the transformer. The switch 11 is thereupon closed to connect the heating element 2 to the low-voltage terminals of the transformer 1. A lesser amount of heat is now developed by the heating element 2 to maintain the temperature of the furnace between predetermined limits.

As heat is again developed by the heating element 2 subsequent to its connection to the transformer by the switch 11, the temperature of the furnace is gradually increased until the thermal-responsive element 34 of the thermostat re-engages the contact member 36. The motor-operated snap switch 26 is thereupon again actuated to open the circuit of the coil 16 that controls the switch 11 by opening the circuit between the contact members 30 and 32.

As the temperature of the furnace again decreases, the thermostat completes a circuit at the contact 35 and through the contact members 29 and 31 and the bridging member 28 of the snap switch that energizes the motor 27 to again complete the circuit of the coil 16.

The temperature of the furnace 3 is then maintained between the two predetermined limits that are determined by the relative positions of the contact members 35 and 36 by closing and opening the switch 11 to control the connection of the heating element 2 to the transformer 1.

When the operation of the furnace is no longer desired, the snap switch 20 is actuated to the position in which it is illustrated in the drawing, to energize the resetting coil 43 of the transfer relay 8, whereupon the circuit of the coil 12 is opened at the switch 39 and at the snap switch 20 between the terminals 22 and 24.

If, during the operation of the furnace, a fault should occur in the heating element 2 that would cause excess current to be drawn from the transformer, the switch 45 would be opened and latched in its open position by the overload relay 6, whereupon the energizing circuit of the coils 13 and 16 would be opened, depending upon which coil happened to be energized at the time. The corresponding switch 9 or 11, whereby the heating element 2 is connected to the transformer, would be opened to disconnect the heating element from the transformer. After the clearing of the fault, the switch 45 of the overload relay 6 is released and reset for subsequent operation.

My invention thus contemplates supplying a large amount of heat to the furnace at the beginning of the operation to develop a predetermined temperature therein and thereafter supplying only sufficient heat to supply losses and to maintain the temperature of the furnace between predetermined limits.

My invention is not limited to the specific devices that are illustrated or to the arrangement that is shown, since modifications may be made therein within the spirit and scope of my invention, as set forth in the appended claims.

I claim as my invention:

1. In an electric furnace, the combination with a heating element, an electric circuit, a transformer provided with taps, and two switches provided with operating coils and moving to connect the heating element to different taps, of a control circuit, a control switch for connecting the control circuit to the operating coils of both switches, a transfer switch in the control circuit to select the coil to be energized, and a thermally-controlled switch for controlling the energization of one coil.

2. In an electric furnace, the combination with a heating element, an electric circuit, a transformer provided with taps, and two switches provided with operating coils and moving to connect the heating element to different taps, of a control circuit for the two switches comprising a starting switch, a thermally-controlled switch and a transfer relay, said switches and relay co-operating to close one main switch when the furnace is cold, opening the main switch when a predetermined temperature is attained and then controlling the operation of the second switch to maintain the temperature of the furnace between two predetermined values.

3. In an electric furnace, the combination with a heating element, an electric circuit, a transformer provided with taps, and two switches provided with operating coils and moving to connect the heating element to different taps, of a control circuit for the two switches comprising a starting switch, a thermally-controlled switch and a transfer relay, operation of the starting switch serving to close one main switch whereupon the transfer relay is actuated to a position for controlling the actuation of the second main switch, and a thermally-controlled switch for co-operating with the transfer relay to control the operation of the second main switch.

4. A control circuit for a furnace, provided with a heating element adapted to be connected to an electric circuit, comprising a divided circuit, each portion including the operating coil of a main connecting switch between the heating element and the circuit, and a relay switch normally in circuit with one operating coil and actuated into circuit with the other operating coil after the energization of the first operating coil.

5. A control circuit for a furnace, provided with a heating element adapted to be connected to an electric circuit, comprising a divided circuit, each portion including the operating coil of a main connecting switch between the heating element and the circuit, and a relay switch normally in circuit with one operating coil and actuated into circuit with the other operating coil after the energization of the first operating coil, and an auxiliary switch controlled by the first main connecting switch to close-circuit the relay switch before it is actuated into circuit with the operating coil of the second main connecting switch.

6. A control circuit for a furnace, provided with a heating element adapted to be connected to an electric circuit, comprising a divided circuit, each portion including the operating coil of a main connecting switch between the heating element and the circuit, and a relay switch normally in circuit with one operating coil and actuated into circuit with the other operating coil after the energization of the first operating coil, and a thermally-controlled switch for controlling the circuit of the second operating coil.

7. A control circuit for an electric furnace, provided with a heating element adapted to be connected to an electric circuit, comprising a divided circuit, each portion including the operating coil of a main connecting switch between the heating element and the circuit, and a switch at each end of the divided circuit operating to control one portion of the divided circuit below a predetermined temperature and to control the other portion after such temperature is attained.

In testimony whereof, I have hereunto subscribed my name this 2nd day of November 1921.

WALTER C. DIXON.